(12) United States Patent
Ebey et al.

(10) Patent No.: US 11,548,482 B2
(45) Date of Patent: Jan. 10, 2023

(54) PLACEMENT AND HEATING ENHANCEMENT OF WINDSHIELD WIPERS FOR VEHICLE PROTECTION, INCLUDING REARVIEW MIRROR WIPERS

(71) Applicant: BLADES GALORE, LLC., San Jose, CA (US)

(72) Inventors: Barbara Martina Ebey, San Jose, CA (US); Sidney Bell, Chicago, IL (US)

(73) Assignee: BLADES GALORE, LLC., San Jose, CA (US)

( * ) Notice: Subject to any disclaimer, the term of this patent is extended or adjusted under 35 U.S.C. 154(b) by 0 days.

(21) Appl. No.: 17/018,774

(22) Filed: Sep. 11, 2020

(65) Prior Publication Data

US 2021/0101566 A1 Apr. 8, 2021

Related U.S. Application Data

(60) Provisional application No. 62/973,057, filed on Sep. 16, 2019.

(51) Int. Cl.
*B60S 1/44* (2006.01)
*B60S 1/56* (2006.01)
*B60S 1/54* (2006.01)
*B60R 1/06* (2006.01)

(52) U.S. Cl.
CPC ............ *B60S 1/566* (2013.01); *B60R 1/0602* (2013.01); *B60S 1/44* (2013.01); *B60S 1/546* (2013.01)

(58) Field of Classification Search
CPC .................. B60S 1/48; B60S 1/56; A47L 1/00
See application file for complete search history.

(56) References Cited

U.S. PATENT DOCUMENTS

| 4,145,788 | A  | * | 3/1979  | Ferrarelli | B60S 1/023 15/250.16 |
| 4,763,381 | A  | * | 8/1988  | Williams   | B60R 1/0602 15/250.05 |
| 6,032,323 | A  | * | 3/2000  | Smith      | B60S 1/3404 15/250.04 |
| 7,540,060 | B2 | * | 6/2009  | Holmes     | B60S 1/566 359/872 |
| 8,550,147 | B2 | * | 10/2013 | Lansinger  | B60S 1/487 165/47 |
| 8,925,620 | B2 | * | 1/2015  | Lansinger  | B60S 1/487 165/47 |
| 2020/0189529 | A1 | * | 6/2020 | Jackson    | B60S 1/50 |

\* cited by examiner

*Primary Examiner* — Michael D Jennings
(74) *Attorney, Agent, or Firm* — Brundidge & Stanger, P.C.

(57) ABSTRACT

A visibility enhancement system for a vehicle with heating conduit and a method of making a windshield wiper system where a wiper blade is configured to wipe windshield of the vehicle, a wiper blade assembly holds at least one end of the wiper blade, a motor is configured to move the wiper blade upon activation of the visibility enhancement system, and a heating conduit warms the surface of the windshield of the vehicle. The visibility enhancement system may include a wiper blade to wipe a side window of the vehicle, a pair of wiper blades to wipe a side rearview mirror. The heating conduit may comprise of any of the following: heating filaments that warms the wiper blade; heating filaments running within the windshield; an air vent that runs inside the wiper blade; and an air vent that runs parallel to the wiper blade.

20 Claims, 5 Drawing Sheets

PLACEMENT AND HEATING ENHANCEMENT OF WINDSHIELD WIPERS FOR VEHICLE PROTECTION, INCLUDING REARVIEW MIRROR WIPERS

CROSS-REFERENCED TO RELATED APPLICATION

The present non-provisional application claims benefit under 35 USC 119(e) of U.S. Provisional Patent Application Ser. No. 62/973,057, filed Sep. 16, 2019, entitled "PLACEMENT AND HEATING ENHANCEMENT OF WINDSHIELD WIPERS FOR VEHICLE PROTECTION, INCLUDING REARVIEW MIRROR WIPERS" the entire disclosure of which is incorporated herein by reference in their entireties.

BACKGROUND OF THE INVENTION

1. Field of the Invention

Embodiments disclosed herein generally relate to a visibility enhancement system for a vehicle with a wiper and a heating conduit and a method for making a visibility enhancement system for a vehicle. More specifically, the disclosed embodiments relate to a visibility enhancement system that enhances the vehicle operation with better visibility through a windshield, windows, and rearview mirrors. The visibility enhancement system may comprise wipers for side windows, back windows and side rearview mirrors. The provided windshield wiper compliments the existing design of a vehicle and does not impair functions of a vehicle including the operation of windows and the view of rearview mirrors.

2. Description of the Related Art

Most vehicles are operated even in severe weather. When it is below zero (0) degrees Celsius, a problem of icing and fogging of windows and windshields may arise. Ice forms on the inside of car windows when moisture in the car evaporates, condenses, and freezes as the car cools. If ice is formed or snow tightly adheres a windshield or a window, it is very difficult to remove ice and snow completely and quickly without damaging the window or the windshield by scraping off ice or snow. When a windshield is covered with ice or snow, it is necessary to remove ice or snow before starting a vehicle because the low visibility through the windshield prevents safe operation of the vehicle and may pose a serious danger to a driver and a passenger. An effective way of quickly clearing fogging and icing of windshields and windows is needed.

Due to forward motion of a vehicle, vehicles commonly have windshield wipers that clean a windshield by a swinging mechanism and maintain the visibility through the windshield for an operator. Typically, windshield wipers clear rain and snow; however, many vehicles lack the ability to clear fogging and icing of windshields without use of anti-fogging or deicer liquid. As an alternative method of fogging and icing prevention, warmed gas or heated liquid that can be discharged from an outlet toward the outer surface of windshields or windows, or a heater of a windshield that is placed upon or inside a windshield, have been proposed. These options have required a lot of time, energy, and/or fuel, and did not meet the need to clear icing or fogging in a cost-effective manner, which is required in today's ecology-conscious environment.

Moreover, when a vehicle is operated for long-distance transportation, construction, rescue operation, and other industrial purposes, the safe and accurate vehicular operation is essential. A vehicle will have a significantly improved performance in severe conditions if the vehicle's rear and side surroundings can be clearly checked in a rearview mirror and through side windows. However, existing vehicles lack a system for securing a great visibility in these areas of the vehicle.

SUMMARY OF THE INVENTION

In one aspect of the present disclosure, a visibility enhancement system with a wiper and a heating conduit comprises a wiper blade, a wiper blade assembly, a motor, and a heating conduit. The wiper blade is configured to wipe a windshield and a window of the vehicle, the wiper blade assembly holds at least one end of the wiper blade, the motor is configured to move the wiper blade upon activation of the visibility enhancement system, and the heating conduit warms the surface of the windshield of the vehicle.

Further, in another aspect of the present disclosure, a method for making a visibility enhancement system with a wiper and a heating conduit, the method comprising installing a motor in a vehicle, placing a wiper blade assembly in the vehicle, stationing a wiper blade in the wiper blade assembly, connecting the motor to the wiper blade; and positioning a heating conduit that provides heat to a windshield and a window of the vehicle. The wiper blade is configured to wipe the windshield and the window, the wiper blade assembly holds at least one end of the wiper blade, the motor is configured to move the wiper blade upon activation of the visibility enhancement system, and the heating conduit warms the surface of the windshield of the vehicle.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure. While the foregoing and following written and illustrated disclosure focuses on disclosing example embodiments of the claimed invention, it should be clearly understood that the same is by way of illustration and example only and the invention is not limited thereto, wherein in the following brief description of the drawings:

DETAILED DESCRIPTION OF THE INVENTION

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

Specific details are given in the following description to provide a thorough understanding of the embodiments. However, it will be understood by one of ordinary skill in the art that the embodiments may be practiced without these specific details. For example, systems, networks, processes, and other components may be shown as components in block diagram form in order not to obscure the embodiments in unnecessary detail. Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The present invention as will be described in greater detail below provides a visibility enhancement system with a wiper and a heating conduit for clearing a windshield, a window, and a side rearview mirror of a vehicle and a method of making a visibility enhancement system with a wiper and a heating conduit. The present invention provides various embodiments as described below. However, it should be noted that the present invention is not limited to the embodiments described herein, but could extend to other embodiments as would be known or as would become known to those skilled in the art.

Figure 1:
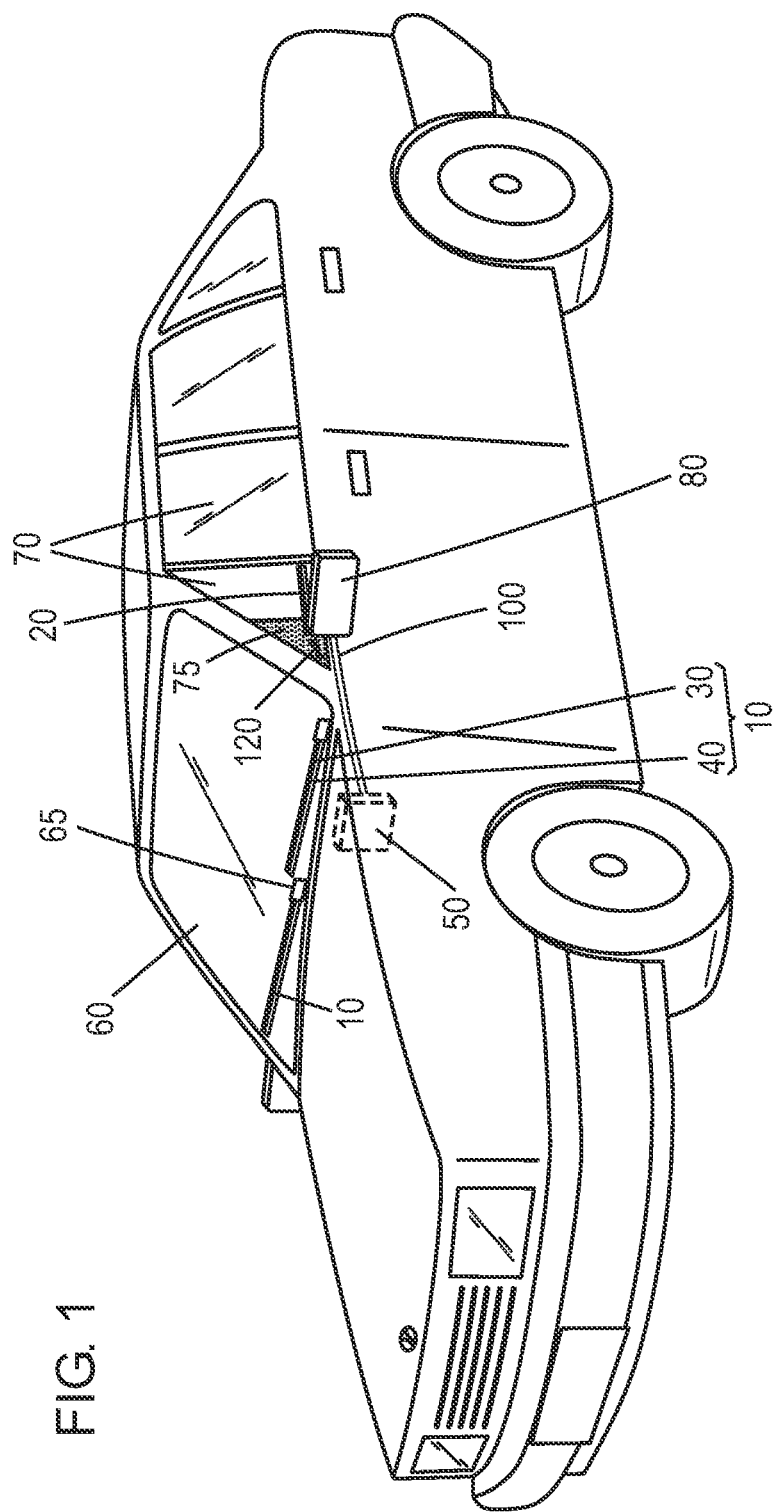
FIG. 1 is a perspective view of a motor vehicle with a visibility enhancement system with a wiper and a heating conduit that can be implemented within one or more embodiments of the present invention.

FIG. 1 is a perspective view of a motor vehicle with a visibility enhancement system with a wiper and a heating conduit. While a sedan is used as an exemplary, the present invention may be adopted in any type of vehicle, a SUV, a minivan, a truck, an ambulance, a bulldozer, or other industrial purpose vehicles.

In FIG. 1, a windshield wiper 10, a window wiper 20, a wiper blade 30, a wiper blade assembly 40, and a motor 50 are illustrated. A preferred embodiment of a wiper blade is made of rubber, flexible but durable enough to wipe fluid or snow on a windshield 60 and a side window 70 in an oscillating or swinging movement in real-world weather conditions.

Although the disclosure is described using both a windshield wiper and a side window wiper, a side window wiper is optional, and any other embodiments (such as a back window wiper) are possible.

According to one or more embodiments, the windshield wiper 10 is vertically aligned and moves back and forth horizontally along the windshield 60 between two points. According to one or more embodiments, the windshield wiper 10 is in a resting position at the bottom of the windshield 60, and swings in a pivoting fashion around its attachment point 65 to the skeleton of the vehicle.

The number of the windshield wiper 10 is not limited to a specific number. In a preferred embodiment, two windshield wipers 10 are engaged; one is attached at one end of the bottom of the windshield 60, and another is attached at the middle point of the bottom of the windshield 60.

According to one or more embodiments, the side window wiper 20 may be installed to clear each side window 70. According to one or more embodiments, the side window wiper 20 is in a resting position at the bottom of the side window 70, and swings in a pivoting fashion around an attachment point 75 where a shaft of a wiper is connected to the skeleton of the vehicle.

Although the disclosure in FIG. 1 is provided using a windshield wiper 10 and a side window wiper 20 that are attached to the vehicle's skeleton at one end, the embodiments of the present invention are not limited to the one-point attachment, and may be implemented in any other suitable form, as desired.

The motor 50 of wipers (inclusive of the windshield wiper 10 and a window wiper) may be located inside the vehicle's door, inside the vehicle's skeleton, or in the engine compartment. It may utilize gasoline, gas, or an electrical battery as an energy source for moving the wiper.

In one or more embodiments, the wiper comprises the wiper blade 30 and the wiper blade assembly 40. As one example, a shaft of the wiper is formed by a part of the wiper blade assembly 40, or a whole of the wiper blade assembly 40. The wiper blade assembly 40 may include a frame of the wiper blade 30. In one example, it also includes a truss saddle, clamping devices, and a frame cover. In some embodiments, the frame constitutes the shaft of the wiper. A person with ordinary skill in the art can employ any known way of preparing the wiper.

According to one or more embodiments, at least one end of the wiper blade assembly 40 is connected to the motor 50. In preferred embodiments, the wiper blade assembly 40 includes a connector. In some embodiments, electric currents that are supplied by the motor 50 to the connector are transformed to the connector's movements.

In one example, a driver's actuation of the wiper will produce the connector's pivotal movement at the point of attachment of the wiper to the vehicular skeleton. Thereafter, the connector's movement may translate into the wiper's rotatory or swinging motion. In one embodiment, the motor 50 creates the connector's cam-type rotation to move the wiper blade 30.

In a preferred embodiment, the visibility enhancement system is configured to wipe the windshield 60 and the window effectively without impairing the vehicle's function or exterior design. In some embodiments, the shape and configuration of the wiper blade 30 is selected so that the wiper blade 30 can remove substantially all of water or snow on the area of the windshield 60 or the window where it can reach.

In a preferred embodiment, a driver can actuate the wiper and control the wiper movement by a switch on a dashboard or a steering wheel. An ordinary skilled person may employ any available technologies for the wiper control, including voice control.

Figure 2A:
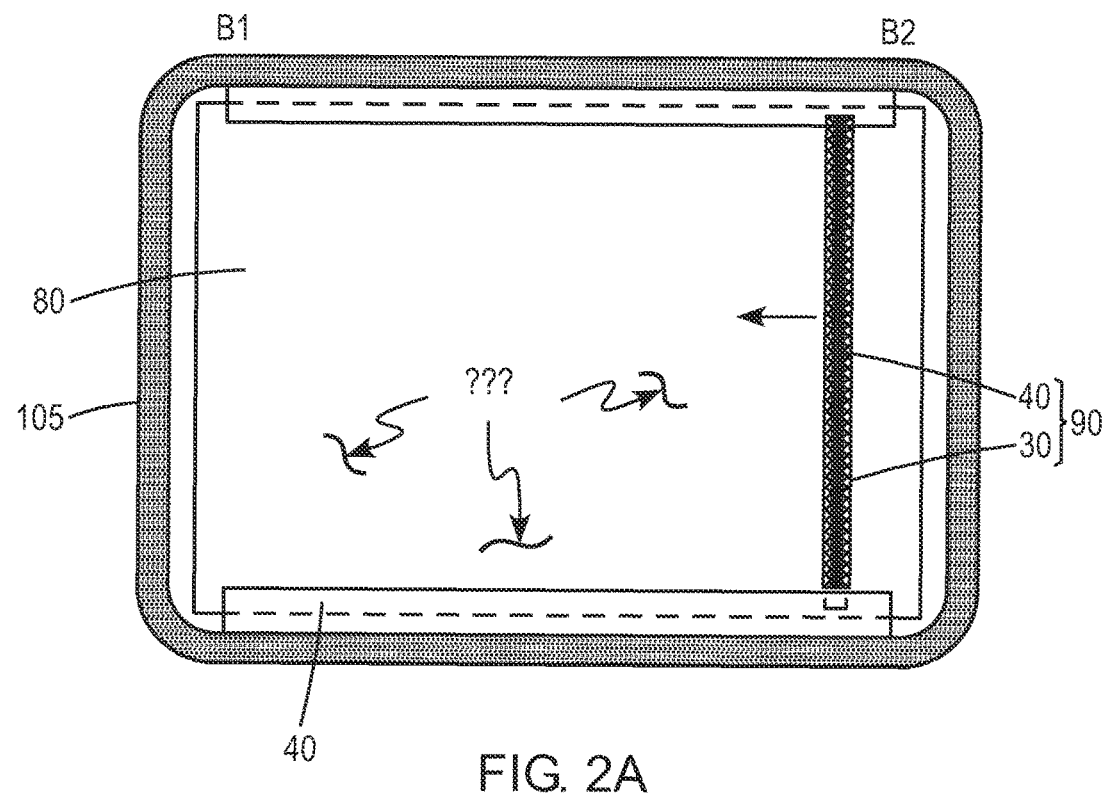
FIG. 2A is a front view of a side rearview mirror showing the placement and movement of a wiper blade and the structure of a wiper blade assembly of a visibility enhancement system that can be implemented within alternative embodiments of the present invention.
Figure 2B:
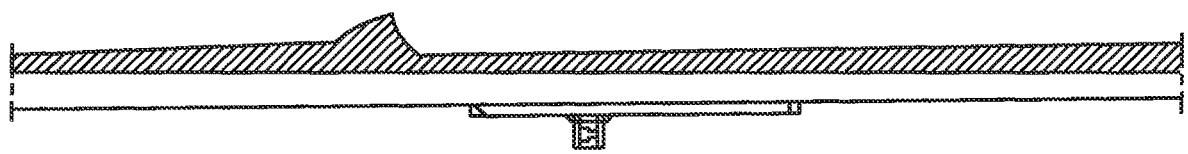
FIG. 2B is a top view of a side rearview mirror showing the placement and movement of a wiper blade and the structure of a wiper blade assembly of a visibility enhancement system that can be implemented within alternative embodiments of the present invention.

FIGS. 2A and 2B illustrate a front and top view respectively of a side rearview mirror 80. These figures illustrate the side rearview mirror wiper 90, the wiper blade 30 and the wiper blade assembly 40. As one embodiment, the wiper 90 is held at its two ends 95 by supporting rails 130 of the wiper blade assembly 40. In a preferred embodiment, the vehicle may be equipped with a pair of wipers that are configured to wipe side rearview mirrors 80 of the vehicle.

Figure 3:
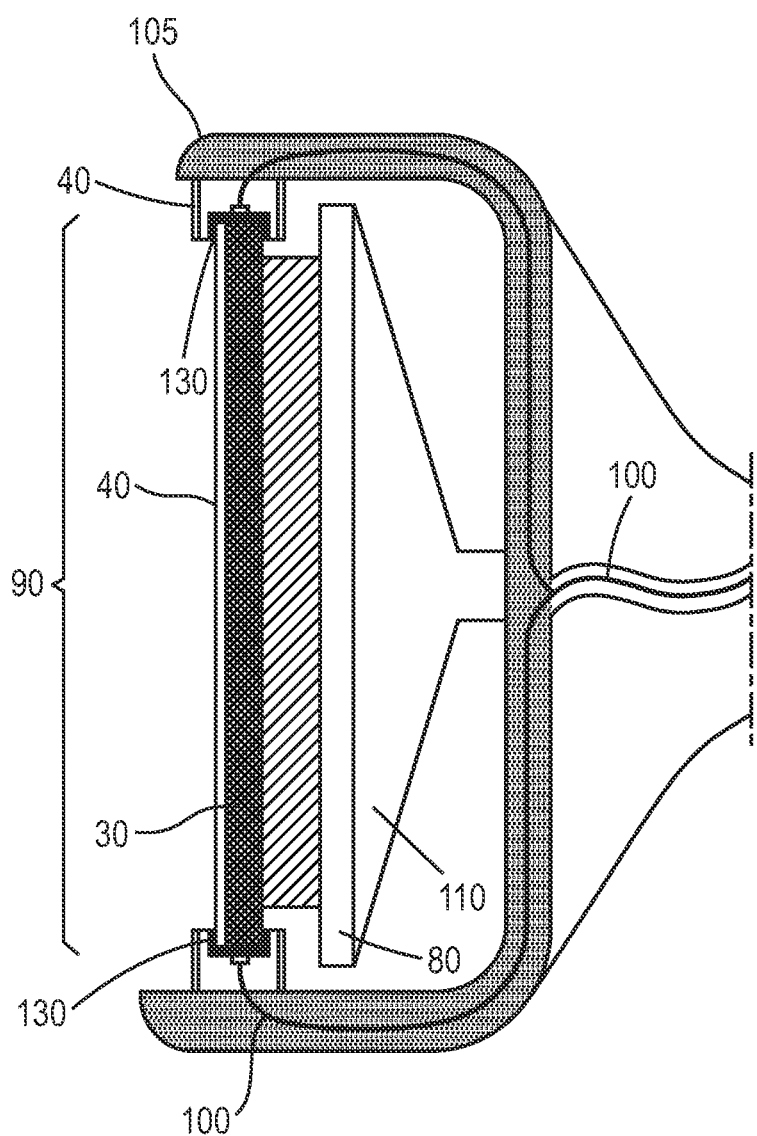
FIG. 3 is a side view of a side rearview mirror showing the placement of a wiper blade and the structure of a wiper blade assembly, electronic wiring to control wiping, consis

FIG. 3 is a side view of the side rearview mirror 80. It shows the wiper blade 30, the wiper blade assembly 40, a mirror casing 105, and a housing 110 of electronic cords and wirings 100. The electronic cords and wirings 100 may control the side rearview mirror wiper 90. In some embodiments, the electronic cords and wirings 100 may control the wiper 90 that can be implemented within alternative embodiments of the present invention. Yet, in some embodiments, the electronic cords and wirings 100 may further control heating of the side rearview mirror 80, consistent with the disclosed visibility enhancement system.

As shown in FIG. 2 and FIG. 3, the casing 105 may accommodate the housing 110 and supporting rails 130 for the wiper blade assembly 40 to move. The casing 105 may be made of any durable material known by a person of ordinary skill in the art.

As shown in FIG. 2, in one or more embodiment, the wiper 95 moves horizontally from one end to the other end of the side rearview mirror 80 along the supporting rails 130. The wiper blade 30 may be configured to move linearly along a supporting rail within a casing 105. The supporting rails 130 are optional, and they may be attached to the mirror casing 105 at the point the wiper 95 is fixed.

According to one or more embodiments, a mirror casing 105 may have an infundibular housing 110 behind the side rearview mirror 80, which places the side rearview mirror 80 in the casing 105. In one or more embodiments, electrical wirings that provide mechanical control of the wiper blade 30 may be placed in the housing 110. The electrical wirings may directly control the wiper blade 30, or indirectly through the wiper blade assembly 40.

In some examples, the electrical wirings that control the side rearview mirror 80 may also be stored in the housing 110. In one or more embodiments, heating filaments that heat the side rearview mirror 80 may be placed in the housing 110. Although the disclosure is provided using one side rearview mirror wiper 90 attached to the vehicle's skeleton at two ends, the embodiments of the present invention are not limited to the two-point attachment, and may be implemented in any other suitable form, as desired.

In one or more embodiments, heating filaments are manufactured into the side rearview mirror 80 to heat it from inside. Yet, in one or more alternative embodiments, a heating plate is positioned behind the side rearview mirror 80 to provide heat. In one embodiment, heated air is supplied through an air duct that runs in the housing 110 and the mirror casing 105. A person with ordinary skill in the art can employ any available technology to make heating conduits for the side rearview mirror 80.

Figure 4A:
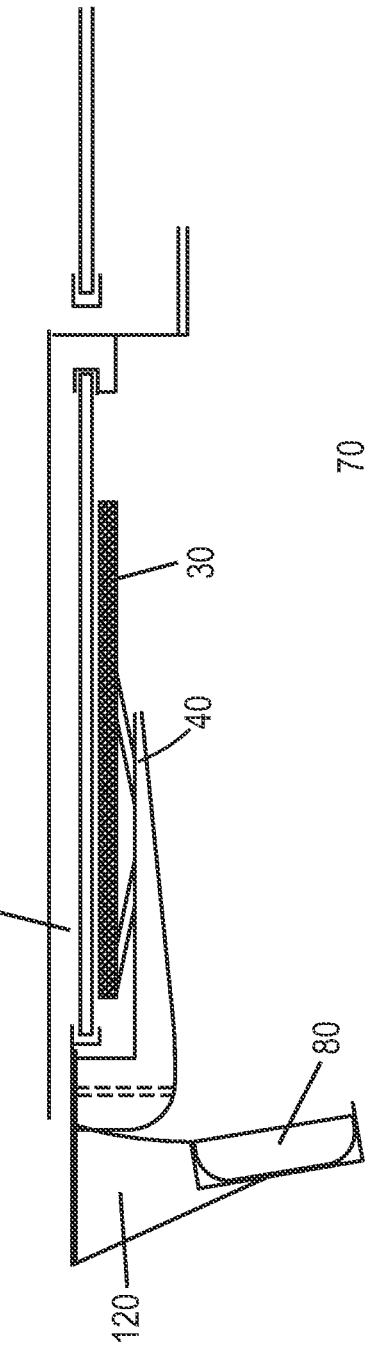
- FIG. 4A is a top view of a driver-side side window and a side rearview mirror showing the structures and positions of a side rearview mirror, a wiper blade assembly, a wiper blade, and a mounting plate of a visibility enhancement system that can be implemented within alternative embodiments of the present invention.

FIG. 4A is a top view of a driver-side side window 70. The exemplary location and structure of the mounting plate 120 of the side rearview mirror 80, the side window wiper 20, the wiper blade assembly 40, and the wiper blade 30 are described.

As shown in FIG. 4A, in a preferred embodiment, these components are manufactured and positioned in a manner that the vehicle driver's rear view through the side rearview mirror 80 will not be obstructed by the presence and movement of the wiper 20.

The side rearview mirror 80 may connect by a supporting arm to the mounting plate 120.

As one example, the housing 110 stores electrical wirings that provide mechanical control of the wiper blade 30 or the side rearview mirror 80, and is installed inside the mirror casing 105. In one or more embodiments, the housing 110 of wirings constitutes a part of the mirror casing 105. In one or more embodiments, heating wirings may be placed in the housing 110. The electrical wirings may directly control the wiper blade 30, or indirectly through the wiper blade assembly 40, or by both mechanisms.

Figure 4B:
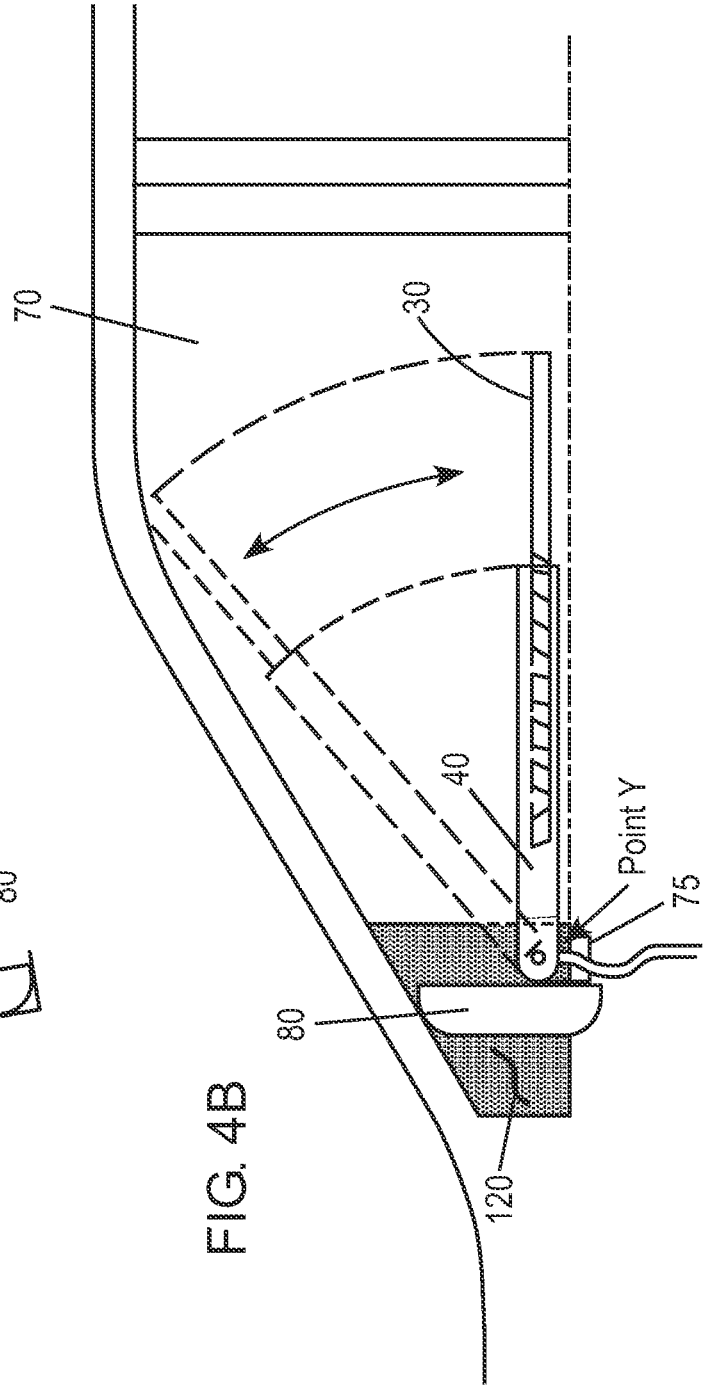
FIG. 4B is a side view of a driver-side side window and a side rearview mirror showing the structures and positions of a side rearview mirror, a wiper blade assembly, a wiper blade, and a mounting plate of a visibility enhancement system to be implemented within one or more embodiments of the present invention.

FIG. 4B is a side view of a driver-side side window 70 and the side rearview mirror 80. It illustrates that the length of the wiper 20 is properly adjusted to the shape and the size of the side window 70 such that the wiper 20 can reach most of the anterior surface area of the side window 70 and a driver can see the side rearview mirror well. In one or more embodiments, the mounting plate 120 is fixed to the vehicle's skeleton immediately anterior to the side window 70. In one or more embodiments, the pivoting point 75 of the side window wiper 20 is located immediately posterior to the root of the side rearview mirror 80, in a posterior portion of the mounting plate 120.

As shown in FIGS. 4A and 4B, in a preferred embodiment, the position and the structure of the wiper 20 and the mounting plate 120 do not interfere with the function of the side rearview mirror 80 and the side window 70 of the vehicle. In a preferred embodiment, the structural design and the location of the wiper 20, the mirror 90, and the mounting plate 120 is decided in accordance with the make and model of the vehicle, for example, the shape and curvature of the side window 70.

In some embodiments, the structure and location of the wiper blade assembly 40 and the mounting plate 120 are selected to preserve the vehicles' structural design and function of the vehicle.

A person with ordinary skill may apply any known alternative technologies for selecting, building, adjusting, and installing the side window wiper 20 and the side rearview mirror 80 in the vehicle without impairing the vehicle's function or exterior design. Although the disclosure is provided using an example showing a driver-side's window wiper 20, the embodiments of the present invention are not limited to one or two side windows 70. The system may have the wiper for a back window.

The visibility enhancement system includes a heating conduit to deice and defrost a windshield 60, windows, and a side rearview mirror 80 of the vehicle. The system for heating the side rearview mirror 80 has been described in previous paragraphs.

According to one or more embodiments, the heating conduit for a windshield 60 and a window comprises of one or more of the following mechanisms: (1) a heating filament that warms the wiper blade 30; (2) a heating filament running within the windshield 60 and the window; (3) an air vent 140 that runs inside the wiper blade 30; and (4) an air vent 140 that runs parallel to the wiper blade.

In one or more embodiments, heating filaments may warm the wiper blade without altering its durability, effectiveness of wiping, and pliability.

In some alternative embodiments, filaments may be a part of an insertable element in the wiper blade 30 which connects with the heating conduit to the electrical system at the attachment point of the wiper through a small socket. As an example, a small socket into which the wiper with filaments makes contact with the electronic circuitry may be placed at the attachment point of the wiper.

In one or more alternative embodiments, filaments are manufactured into the windshield or the window. In a preferred embodiment, filaments will provide heat inside the windshield or the window upon activation.

Heating filaments may run the length of the wiper blade 30, and a part of replaceable elements of the visibility enhancement system.

According to one or more embodiments, the air vent 140 runs parallel to the wiper blade. Further, the air vent 140 may be distanced from the wiper blade 30 to the extent that it does not heat the wiper blade 30. In one or more embodiments, the air vent 140 is fixed to the skeleton of the wiper blade assembly 40, by which the air vent 140 is spatially distanced from the wiper blade 30.

Yet, in one or more alternative embodiments, the air vent 140 may be covered by insulating material that prevents heated air in the air vent 140 from warming the wiper blade 30.

Figure 5:
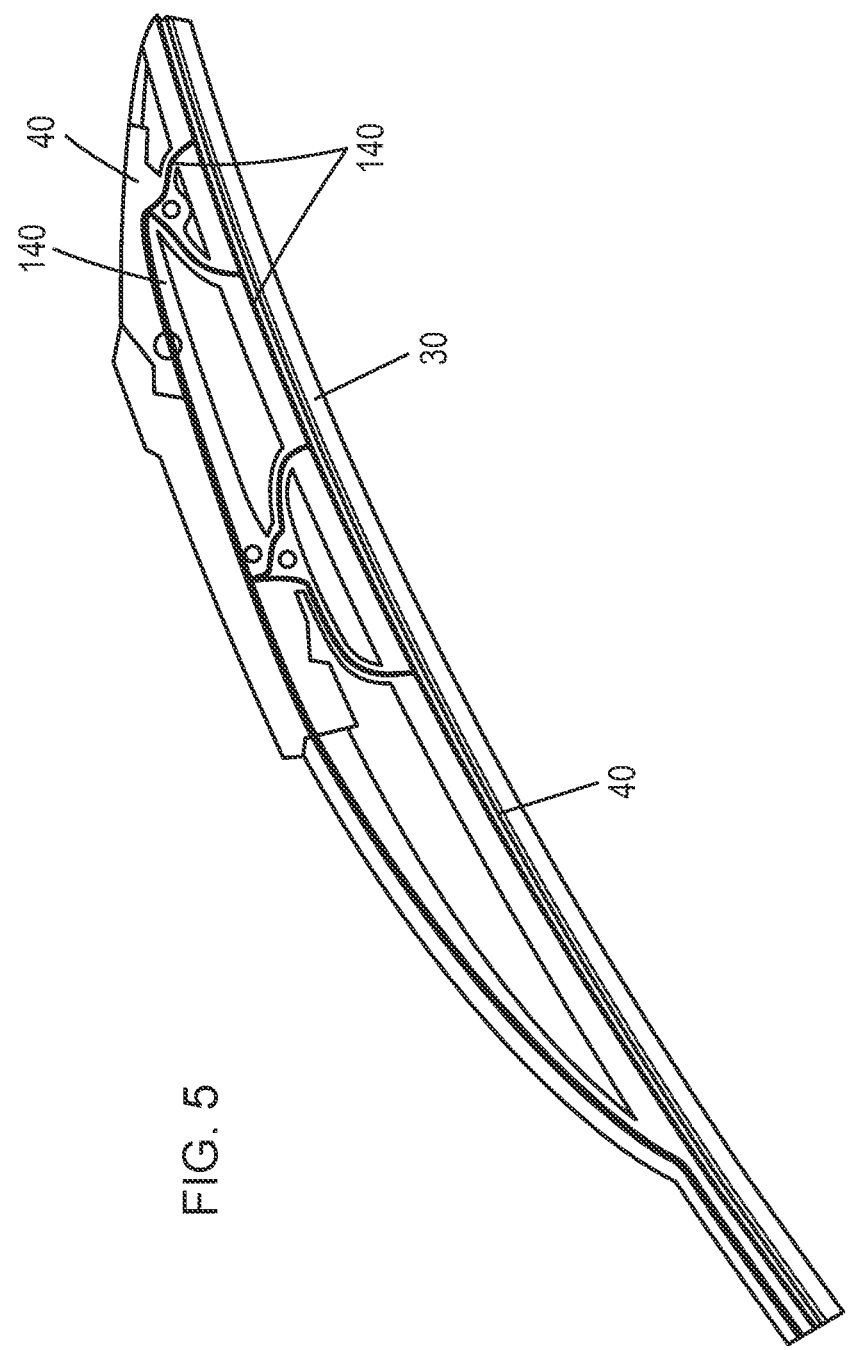
FIG. 5 is a top view of a visibility enhancement system showing the structures and positions of a wiper blade, a wiper assembly, and a heating conduit of the visibility enhancement system according to one or more embodiments of the present invention.

FIG. 5 is a top view of one possible configuration of the wiper and the heating conduit. The air vent 140 connects a heat source that produces heated air to heated air outlets. A person of ordinary skill in the art may use any suitable technology in making the heat source. Further, the heat source may be placed in any part of the vehicle.

The visibility enhancement system may be a user-controllable system in which a driver can selectively actuate one or more wiper among wipers for wiping the windshield 60, wipers for windows, and wipers for the side rearview mirror 80. Further, the driver may also selectively actuate the heating conduit to heat the windshield 60, windows, and the side rearview mirror 80.

Yet, in one or more alternative embodiments, the visibility enhancement system may be a computer-programmed system in which a program automatically actuate one or more wiper among wipers for wiping the windshield 60, wipers for windows, and wipers for the side rearview mirror 80 based on the sensed external condition of the vehicle. Further, the heating conduit may also be actuated by a program.

In one or more embodiments, the system is a vehicle-specific system in which the design of the wiper and the heating conduit is optimized for the structural and functional design of the vehicle, and the use of the vehicle.

The method of making the visibility enhancement system includes steps for installing a motor 50 in the vehicle; placing a wiper blade assembly 40 in the vehicle; stationing a wiper blade 30 in the wiper blade assembly 40; connecting the motor 50 to the wiper blade 30; and positioning a heating conduit that provides heat to a windshield 60 of the vehicle. The wiper blade 50 is configured to wipe the windshield 60 and the window, the wiper blade assembly 40 holds at least one end of the wiper blade, the motor 50 is configured to move the wiper blade 30 upon activation of the visibility enhancement system, and the heating conduit warms the surface of the windshield and the window.

In the step of installing a motor 50 in the vehicle, as shown in FIG. 1, the motor 50 may be located inside the vehicle's door, inside the vehicle's skeleton, or in the engine compartment. It may utilize gasoline, gas, or an electrical battery as an energy source for moving the wiper.

At the steps of placing the wiper blade assembly 40 in the vehicle and stationing a wiper blade 30 in the wiper blade assembly 40, a skilled artisan may include a frame of the wiper blade 30, and employ any known way of preparing the wiper.

In some embodiments, wipers may wipe side windows. Additionally, in some embodiments, wipers may wipe a back window. In a preferred embodiment, the method may further include placing a mounting plate in the vehicle immediately anterior to the side window of the vehicle.

According to one or more embodiments, wipers wipe the windshield 60 and the window effectively without impairing the vehicle's function or exterior design. In some examples, the shape and configuration of the wiper blade 30 is selected so that the wiper blade 30 can remove substantially all of water or snow on the area of the windshield 60 or the window where it can reach.

In a preferred embodiment, a driver can actuate the wiper and control the wiper movement by a switch on a dashboard or a steering wheel. An ordinary skilled person may employ any available technologies for the wiper control, including voice control.

In connecting the motor 50 to the wiper blade 30, in some embodiments, at least one end of the wiper blade assembly 40 is connected to the motor 50 as an intermediary to connecting the wiper blade 30 to the motor 50. In preferred embodiments, the wiper blade assembly 40 includes a connector; and electric currents supplied by the motor 50 to the connector are transformed to the connector's rotatory movements.

In one example, a driver's actuation of the wiper will produce the connector's pivotal movement at the point of attachment of the wiper to the vehicular skeleton, which then translates into the wiper's rotatory or swinging motion. In one embodiment, the motor 50 creates the connector's cam-type rotation to move the wiper blade 30.

In some embodiments, the method of making the enhanced visibility system may include stationing a wiper blade for a mirror, the wiper blade 30 is configured to wipe a side rearview mirror 80 of the vehicle. In such embodiments, the side rearview wiper may be held at its two ends 95 by supporting rails 130 of the wiper blade assembly 40. In a preferred embodiment, the vehicle may be equipped with a pair of wipers that are configured to wipe side rearview mirrors of the vehicle.

Yet in one or more embodiments, electronic cords and wirings 100 may control the side rearview mirror 80 and the side rearview mirror wiper 90. Further, in some embodiments, the electronic cords and wirings 100 may control heating of the side rearview mirror 80, consistent with the disclosed visibility enhancement system.

In some examples, the wiper blade for a mirror is configured to move linearly along a supporting rail.

In one or more embodiments, the method may include positioning electrical wirings that provide mechanical control of the wiper blade 30 in the housing 110. The electrical wirings may directly control the wiper blade 30, or indirectly through the wiper blade assembly 40.

In some examples, the method may include placing electrical wirings that control the side rearview mirror 80 in the housing 110. In one or more embodiments, heating filaments that heat the side rearview mirror 80 may be placed in the housing 110.

Although the disclosure is provided using one side rearview mirror wiper 95 attached to the vehicle's skeleton at two ends, the embodiments of the present invention are not limited to the two-point attachment, and may be implemented in any other suitable form, as desired.

According to one or more embodiments, the method may further comprise placing a heating conduit for the side rearview mirror 80, wherein the heating conduit for a side rearview mirror includes a heating filament running within a side rearview mirror.

In some embodiments, placing the heating conduit comprises of one or more of the following steps: (1) a heating filament that warms the wiper blade; (2) a heating filament running within the windshield and the window; (3) an air vent that runs inside the wiper blade; and (4) an air vent that runs parallel to the wiper blade.

In a preferred embodiment, the method may include placing the air vent running parallel to the wiper blade 30 that does not warm the wiper blade 30 or melt it. For this end, the air vent 140 may be distanced from the wiper blade 30 to the extent that it does not heat the wiper blade 30. In one or more embodiments, the air vent 140 is fixed to the skeleton of the wiper blade assembly 40, by which the air vent 140 is spatially distanced from the wiper blade 30.

Yet, in one or more alternative embodiments, the air vent 140 may be covered by insulating material that prevents heated air in the air vent 140 from warming the wiper blade 30.

A person with ordinary skill may apply any known alternative technologies for selecting, building, adjusting, and installing the side window wiper 20 and the side rearview mirror 90 in the vehicle without impairing the vehicle's function or exterior design. Although the disclosure is provided using an example showing a driver-side's window wiper 20, the embodiments of the present invention are not limited to one or two side windows 70. The system may have the wiper for a back window.

In view of the above, the present method embodiment may therefore take the form of a manual manufacturing process or a computer program-implemented process and apparatus for practicing those processes. This disclosure can also be embodied in the form of computer program code containing instructions embodied in tangible media, such as floppy diskettes, CD ROMs, hard drives, or any other computer-readable storage medium, wherein, when the computer program code is loaded into and executed by a computer or controller, the computer becomes an apparatus for practicing the invention. This disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits. A technical effect of the executable instructions is to implement the exemplary method described above.

Embodiments of the present invention provide a visibility enhancement system for a vehicle with wiper and a heating conduit, comprising a wiper blade, a wiper blade assembly, a motor, and a heating conduit. The wiper blade is configured to wipe a windshield and a window of the vehicle, the wiper blade assembly holds at least one end of the wiper blade, the motor is configured to move the wiper blade upon activation of the visibility enhancement system, and the heating conduit warms the surface of the windshield of the vehicle.

Further, in another aspect of the present disclosure, a method for making a visibility enhancement system with a wiper and a heating conduit, the method comprising installing a motor in a vehicle, placing a wiper blade assembly in the vehicle, stationing a wiper blade in the wiper blade assembly, connecting the motor to the wiper blade; and positioning a heating conduit that provides heat to a windshield and a window of the vehicle. The wiper blade is configured to wipe the windshield and the window, the wiper blade assembly holds at least one end of the wiper blade, the motor is configured to move the wiper blade upon activation of the visibility enhancement system, and the heating conduit warms the surface of the windshield of the vehicle.

While the invention has been described in terms of its preferred embodiments, it should be understood that numerous modifications may be made thereto without departing from the spirit and scope of the present invention. It is intended that all such modifications fall within the scope of the appended claims.

What is claimed is:

1. A visibility enhancement system for a vehicle comprising:
   a wiper blade;
   a wiper blade assembly;
   a motor; and
   a heating conduit comprising an air vent that runs parallel to the wiper blade,
   wherein the wiper blade is configured to wipe a windshield and a window of the vehicle,
   wherein the wiper blade assembly attaches the wiper blade to the vehicle,
   wherein the motor is configured to move the wiper blade upon activation of the visibility enhancement system,
   wherein the heating conduit warms the surface of the windshield and the window of the vehicle.

2. The visibility enhancement system of claim 1, wherein the window includes a side window of the vehicle.

3. The visibility enhancement system of claim 2, wherein the structure and location of the wiper blade assembly is selected to preserve the vehicles' structural design and function of the vehicle.

4. The visibility enhancement system of claim 3, wherein the location of the mounting plate is selected to achieve effective wiping without impairing the vehicle's function or exterior design.

5. The visibility enhancement system of claim 1, further comprising:
   a mounting plate for a side rearview mirror.

6. The visibility enhancement system of claim 5, wherein the structure of the wiper blade assembly and the structure and location of the mounting plate are selected to preserve the vehicles' structural design and function.

7. The visibility enhancement system of claim 1, wherein the wiper blade is configured to wipe the windshield and the window effectively without impairing the vehicle's function or exterior design.

8. The visibility enhancement system of claim 1, wherein a cam-type mechanism is utilized in the rotatory movement of the wiper blade.

9. The visibility enhancement system of claim 1, further comprising:
a mirror wiper blade sized to accomodate smaller dimensions of a mirror, wherein the wiper blade for a mirror is configured to wipe a side rearview mirror.

10. The visibility enhancement system of claim 9, wherein the mirror wiper blade is configured to move linearly along a supporting rail.

11. The visibility enhancement system of claim 1, further comprising:
a mirror heating conduit sized to accomodate smaller dimensions of a side rearview mirror, wherein the heating conduit for a side rearview mirror includes a heating filament inside a side rearview mirror.

12. The visibility enhancement system of claim 1, wherein the heating conduit comprises of one or more of the following mechanisms: (1) a heating filament that warms the wiper blade; (2) a heating filament running within the windshield and the window; and (3) a heating filament that runs within the wiper blade without warming the wiper blade.

13. A method of making a visibility enhancement system with a wiper and a heating conduit for a vehicle, the method comprising:
installing a motor in the vehicle;
placing a wiper blade assembly in the vehicle;
stationing a wiper blade in the wiper blade assembly;
connecting the motor to the wiper blade; and
positioning a heating conduit that provides heat to the surface of a windshield and a window of the vehicle,
wherein the wiper blade is configured to wipe the windshield and the window,
wherein the wiper blade assembly attaches the wiper blade to the vehicle,
wherein the heating conduit comprises an air vent that runs parallel to the wiper blade and the air vent that runs parallel to the wiper blade does not warm the wiper blade, and
wherein the motor is configured to move the wiper blade upon activation of the visibility enhancement system.

14. The method of making a visibility enhancement system of claim 13, wherein the window includes a side window of the vehicle.

15. The method of claim 14, further comprising placing a mounting plate in the vehicle immediately anterior to the side window of the vehicle.

16. The method of claim 13, further comprising stationing a mirror wiper blade, the mirror wiper blade is configured to wipe a side rearview mirror of the vehicle.

17. The method of claim 13, further comprising:
placing a mirror heating conduit, wherein the mirror heating conduit for a side rearview mirror includes a heating filament running within a side rearview mirror.

18. The method of claim 13, wherein the heating conduit comprises of one or more of the following mechanisms: (1) a heating filament that warms the wiper blade; (2) a heating filament running within the windshield and the window; and (3) a heating filament that runs within the wiper blade without warming the wiper blade.

19. A visibility enhancement system for a vehicle comprising:
a wiper blade;
a wiper blade assembly;
a motor; and
a heating conduit,
wherein the wiper blade is configured to wipe a windshield and a window of the vehicle,
wherein the wiper blade assembly attaches the wiper blade to the vehicle,
wherein the motor is configured to move the wiper blade upon activation of the visibility enhancement system,
wherein the heating conduit warms the surface of the windshield and the window of the vehicle, and
wherein the heating conduit comprises of one or more of the following mechanisms: (1) a heating filament running within the windshield and the window; (2) the heating filament that runs within the wiper blade without warming the wiper blade; and (3) an air vent that runs parallel to the wiper blade.

20. The visibility enhancement system of claim 19, wherein the air vent that runs parallel to the wiper blade does not warm the wiper blade.

* * * * *